July 26, 1932. G. B. WRIGHT 1,869,294
AUTOMOBILE TAIL AND STOP LIGHT
Filed Jan. 3, 1929
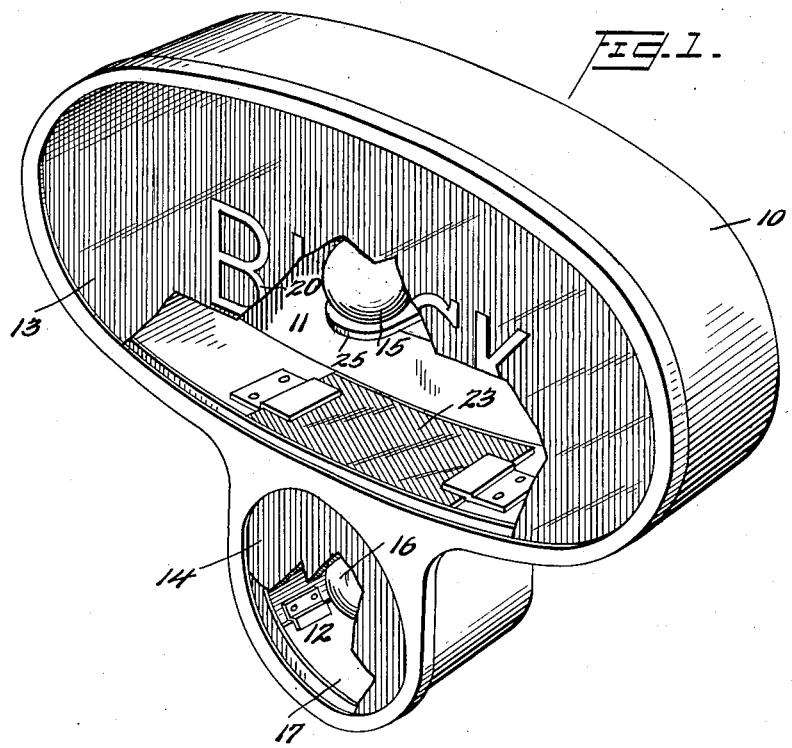
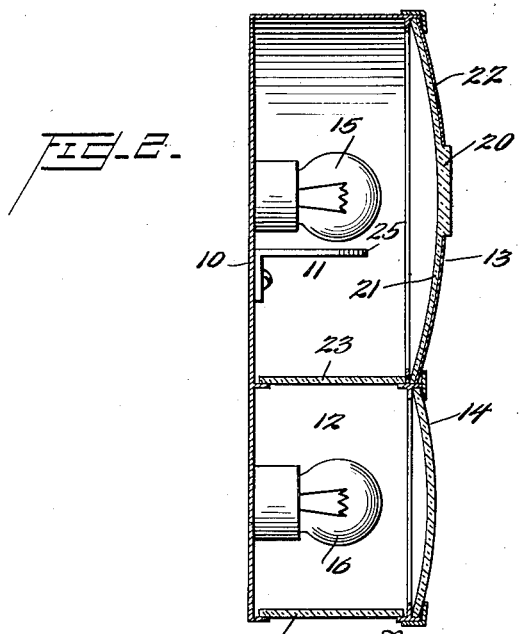

Patented July 26, 1932

1,869,294

UNITED STATES PATENT OFFICE

GEORGE BRADLEY WRIGHT, OF SOUTH NORWALK, CONNECTICUT

AUTOMOBILE TAIL AND STOP LIGHT

Application filed January 3, 1929. Serial No. 330,109.

This invention relates to signal lights and more particularly to combination signal lights.

It is a general object of the present invention to provide a novel and improved combination signal light.

One of the features of the invention comprises the arrangement of a pair of signal lamps in adjacent compartments so that each is adapted to light a lens over its own compartment, together with means whereby the lamp in one compartment may light indicia on the lens of the other.

Another feature of the invention comprises the arrangement of a pair of colored lenses adjacent to each other and each adapted to be lighted by an independent lamp together with translucent indicia on one of said lenses of a different color than the main portion of the lens bearing the indicia and a color screen arranged between the indicia bearing lens and the lamp behind the other lens.

Specifically, the invention comprises the combination of a stop light and a tail light for automotive vehicles in which the tail light lamp burns continuously and the stop light lamp is lighted intermittently to give warning signals. The lens of the stop light is provided with indicia therein of a different translucent color than that of the lens so that when the stop light lamp is lighted, the lens shows one color and the indicia another. When the tail light lamp only is lighted, the light from this lamp shines through a color screen complementary to the color of the stop light lens which is thus caused to appear dark while the light passes through the material forming the indicia since its color is not complementary to that of the screen, and therefore the indicia appear visible at all times whether or not the stop lamp is lighted.

Other and further features and objects of the invention will be more apparent to those skilled in the art upon a consideration of the accompanying drawing and following specification wherein is disclosed a single exemplary embodiment of the invention with the understanding, however, that such changes may be made therein as fall within the scope of the appended claims without departing from the spirit of the invention.

In said drawing:

Figure 1 is a perspective view of a combination stop and tail light with the lenses partially broken away; and Figure 2 is a vertical section therethrough.

In various places it is desired to give a signal or to indicate the presence of objects or even to advertise certain devices by the use of colored lights. Oftentimes contrasting colors are used or similar colors lighted at different times or to different intensities. The present invention contemplates an arrangement whereby a continuous signal may be given supplemented by an intermittent signal, and yet indicia on the lens or glass covering the intermittent signal may be always visible without using any additional lamps except those provided for the two signals and without using any mechanical contrivances or movable parts. The invention is specifically disclosed in connection with a vehicle stop light and tail light combination which is now commonly in use on most automotive vehicles, but it will be understood that the invention is equally applicable to various other signal devices.

Referring to the drawing, there is disclosed at 10 a suitable casing which may be a stamped metal shell having a closed back and sides of any desired configuration to be in accord with the surroundings. It is divided into two compartments 11 and 12. The compartment 11 will be called the "stop light compartment" for convenience, and compartment 12 the "tail light compartment." Each is adapted to have its open end covered by a lens 13, 14, respectively, of any other suitable light transmitting device which will serve to protect the electrical lamps 15 and 16, respectively, in the compartments.

The tail lamp 16 is generally adapted to burn continuously while the vehicle is in use after dark, and the lens 14 is ordinarily of red glass to give an indication or warning signal at the rear of the vehicle. It is customary to provide at the bottom of the tail lamp compartment a white or transparent lens 17 allowing light from the lamp 16 to illuminate the license plate of the vehicle.

The lamp 15 in the stop light compartment is connected to certain of the controls on the vehicle so that it indicates automatically, for instance, the application of the brake or some similar change in the controls of the vehicle which may indicate a proposed change in the velocity thereof. This lamp is, therefore, but intermittently lighted. When lighted, it illuminates the lens 13 which is of some translucent colored material, usually red, yellow or green glass, to give a signal either in contrast to the tail light signal or of larger size and probably of more intensity.

The manufacturers of automobiles are desirous of advertising their vehicles, and since they are difficult to recognize from the rear and particularly in the dark, they sometimes resort to lettering or other indicia on the lens of the stop light, but this name then does not appear visible at night until the lamp in the stop light compartment is lighted, and the name thus is visible for only a very short portion of the time during which the vehicle is in use. The present invention provides means whereby this name may always be visible while the tail light is lighted. In the present case the name of the vehicle is indicated by raised letters 20 embossed on the stop light lens. If they were merely embossed of the same material as the lens, they would show when the stop light 15 was lighted by reason of the difference in thickness and refractiveness of this portion of the lens, but it is proposed, according to the present invention, to form these letters of a different color or of a different degree of translucence.

It is common practice in the manufacture of colored lenses for motor vehicles to apply the color as a thin shell or veneer over a base of plain clear glass. For instance, in the lens 13 as shown in Figure 2, it will be seen that the portion 21 is clear or transparent glass overlaid with a shell or veneer 22 of colored glass, for instance, red. This veneer would cover the surface of the letters as a result of the method of manufacture, but for the purposes of the present invention would be ground off on the faces of the letters so that they would be clear or transparent for their full thickness as shown in the sectional view. Obviously, other means may be resorted to in order to have these letters appear of a different color than that of the lens. They may be inserts of a differently colored glass or other suitable colored material.

When the stop lamp 15 is lighted, the lens will transmit light from the lamp in accordance with the color of the lens, whereas the letters will transmit light from the lamp in accordance with their color or, if they are transparent, will merely transmit the yellowish white light of the lamp, but in any event will appear in contrast to the color of the stop light lens.

In order to provide for the illumination of the letters when the stop lamp 15 is dark, the partition between the tail light compartment and the stop light compartment is formed of a colored screen which may be a sheet 23 of colored glass. The color of this glass must be complementary to that of the stop light lens but not complementary to that of the letters on the stop light lens. For instance, if the stop light lens is red, the colored screen 23 must be green or blue-green so that green light transmitted into the stop light compartment from the tail lamp 16 will be prevented from passing through the stop light lens by reason of its complementary color, so that the lens will appear black. The green light is, however, readily transmitted through the translucent or transparent letters and appears, if the letters are transparent, as green or, if the letters are of some other color, as the color resulting from the mixture of the two. The indicia on the stop light lens will thus be visible at all times. When the tail light is lighted, the letters will appear illuminated from the tail lamp 16 in contrast on a dark background, and when the stop lamp 15 is lighted, will appear in contrasting color on the colored background of the stop light lens.

In order to insure against any green or blue-green light passing through the tail light compartment and falling on the license plate when the stop light bulb is lighted, it may be advisable in some cases to apply a small metal shield or screen 25 below the stop light bulb 15 so as to prevent direct light from this bulb shining through the colored screen 23 and thence onto the license plate through the clear glass 17 of the tail light compartment. Any blue-green light which filters into the tail light compartment will, of course, have no effect on the red lens therein.

It will be seen that the invention provides a novel and simple means of illuminating indicia on one lens by light behind another without causing the first lens to be illuminated and yet which permits the indicia to be seen when the first lens is illuminated. The device is extremely simple, requiring no moving parts and no additional lamps. The only change required in the customary stop light and tail light combination is the insertion of the colored screen 23 and the provision of the lens in the stop light with contrasting colors between the main portion thereof and the letters.

Having thus described the invention, what is claimed as new and desired to be secured by Letters Patent is:

1. In a signal device, in combination, a casing having two compartments, a translucent cover for one compartment, said cover being colored and having indicia thereon of a different color, a light source for said compartment adapted when lighted to cause the cover to show its color and the indicia its color, a source of light in the other compartment and a screen separating said compartments, said screen being of a color complementary to the color of said cover whereby when said second source of light only is lighted said indicia will appear lighted on a dark background.

2. In a signal device for automobiles, in combination, a casing having a stop light compartment and a separate tail light compartment, a lamp in each compartment, a translucent colored lens over said stop light compartment, indicia in said lens of a different translucent color, whereby, when the stop light lamp is lighted, the lens and indicia will each show its color, an exposed colored lens over said tail light compartment and a translucent screen between said compartments of a color complementary to that of said stop light lens.

3. In a signal device, in combination, a lens of translucent color, indicia in said lens of a different translucent color, a lamp back of said lens to light it and the indicia so that each shows its color, a second lamp and a screen between said second lamp and said lens, said screen being of a translucent material with a color complementary to that of the lens.

4. In a signal device, in combination, a stop light having a translucent colored lens, indicia on said lens adapted to transmit a different colored light than said lens, means to light said indicia and lens together and means including the colored lens to make said indicia alone visible.

5. In a vehicle light, in combination, a casing having two compartments, a lamp in each compartment, a lens over one compartment to be lighted continuously by the lamp therein, a colored lens over the second compartment and adapted to be lighted only by the lamp therein, indicia on said lens over the second compartment and means including the color of the lens over the second compartment whereby each lamp may independently cause said indicia to be visible.

6. A combination tail and stop light for vehicles including a casing divided into two adjacent compartments, a lamp in each compartment, a colored lens exposed to view over one compartment adapted for continuous illumination by the lamp therein to act as a tail light, a translucent colored lens exposed to view over the other compartment adapted to be intermittently lighted by the lamp therein to act as a warning signal, indicia indicated on said second lens by translucent colored material of a color contrasting with that of the main body of the lens, and a screen of translucent material separating said compartments of a color complementary to that of the second lens.

7. In a signal device, in combination, a pair of colored lenses directly exposed to view, indicia on one lens of a color different than that of the lens, a lamp for each lens to light it independently, and means including the color of the lens carrying the indicia whereby one light may cause its lens and the indicia only on the other to be visible.

8. In a signal device, in combination, a pair of lenses directly exposed to view, a lamp for each lens to light all of it independently and means including a portion of one lens to render visible the remainder only thereof and the other lens by the lamp for the other lens.

9. In a rear lamp for vehicles, in combination, a casing divided into two adjacent compartments, a lamp in each compartment adapted to be independently lighted, a colored lens directly exposed to view over one compartment, a two colored lens exposed to view over the other compartment, and a color screen between said compartments complementary to one part of said two colored lens.

In testimony whereof I hereunto affix my signature.

GEORGE BRADLEY WRIGHT.